(12) United States Patent  (10) Patent No.: US 9,303,816 B1
Browning  (45) Date of Patent: Apr. 5, 2016

(54) MATERIALS CAPTURE, CONTAINMENT, STORAGE

(71) Applicant: Michael D. Browning, Victoria, TX (US)

(72) Inventor: Michael D. Browning, Victoria, TX (US)

(*) Notice: Subject to any disclaimer, the term of this patent is extended or adjusted under 35 U.S.C. 154(b) by 0 days.

(21) Appl. No.: 14/509,893

(22) Filed: Oct. 8, 2014

Related U.S. Application Data

(60) Provisional application No. 61/888,453, filed on Oct. 8, 2013.

(51) Int. Cl.
F16N 31/00 (2006.01)
B65D 90/24 (2006.01)

(52) U.S. Cl.
CPC .............. *F16N 31/006* (2013.01); *B65D 90/24* (2013.01)

(58) Field of Classification Search
CPC ....... B65D 90/24; F16N 31/00; F16N 31/002; F16N 31/006; F16N 31/02
USPC ................... 220/571, 573, 666, 676, 9.1–9.4, 220/DIG. 5; 141/86
See application file for complete search history.

(56) References Cited

U.S. PATENT DOCUMENTS

| | | | |
|---|---|---|---|
| 1,521,300 A | 12/1925 | Johnson | |
| 2,938,602 A | 5/1960 | Horrocks | |
| 3,661,227 A | 5/1972 | Robel | |
| 3,933,002 A | 1/1976 | Vickery | |
| 4,798,754 A * | 1/1989 | Tomek | F16N 31/006 184/106 |
| 5,134,857 A * | 8/1992 | Burley | 62/235 |
| 5,206,964 A | 5/1993 | Wilson | |
| 5,511,683 A | 4/1996 | Dailey | |
| 8,303,527 B2 * | 11/2012 | Joseph | 602/8 |
| 8,740,006 B2 | 6/2014 | Matson | |
| 2009/0314786 A1* | 12/2009 | Cardinale | 220/592.2 |
| 2011/0100374 A1* | 5/2011 | Silfverskiold | 128/845 |
| 2012/0312821 A1* | 12/2012 | Matson | 220/573 |
| 2014/0093698 A1* | 4/2014 | Perry et al. | 428/172 |

* cited by examiner

*Primary Examiner* — Anthony Stashick
*Assistant Examiner* — Mollie Llewellyn
(74) *Attorney, Agent, or Firm* — Buche & Associates, P.C.; John K. Buche; Scott D. Compton

(57) ABSTRACT

The present application is directed to containers operationally configured to capture, contain or otherwise store or hold fluids and solids. A suitable container may be travelable and include a first member defining the outer surface and inner surface of the container and one or more second members housed within the first member for forming the perimeter of the container. The one or more second members are suitably operationally configured to allow the container to be folded.

18 Claims, 15 Drawing Sheets

| PROPERTIES | TEST METHOD | MINIMUM AVERAGE VALUES | | | |
|---|---|---|---|---|---|
| | | 25 mil | 30 mil | 36 mil | 36 mil |
| Thickness*, mil | ASTM D 5199 | 22 | 27 | 32 | 32 |
| Color [1] | | G/B, B/B | G/B, B/B | G/B, B/B | G/B, B/B |
| Reinforcing Scrim Type | | 1000 Denier PET | 1000 Denier PET | 1000 Denier PET | 1300 Denier PET |
| Asperity Height, mil | ASTM D 7466 | >20 | >20 | >20 | >20 |
| Tensile Properties<br>   Maximum Strength MD[2], lb. (N)<br>   Maximum Strength MD[3], lb. (N) | ASTM D 7004 | <br>130 (579)<br>130 (579) | <br>180 (801)<br>180 (801) | <br>210 (935)<br>210 (935) | <br>280 (1246)<br>280 (1246) |
| Tensile Properties<br>   Maximum Strength MD[2], ppi<br>   Maximum Strength TD[3], ppi<br>   Elongation at Peak Strength MD[2], %<br>   Elongation at Peak Strength TD[3], %<br>   Elongation at Film Break MD[2], %<br>   Elongation at Film Break TD[3], % | ASTM D 7003 | <br>62<br>62<br>20<br>20<br>470<br>470 | <br>88<br>80<br>20<br>20<br>500<br>450 | <br>90<br>90<br>20<br>20<br>300<br>300 | <br>148<br>148<br>20<br>20<br>300<br>300 |
| Tear Resistance,<br>   Tear Strength MD[2], lb. (N)<br>   Tear Strength TD[3], lb. (N) | ASTM D 5884 | <br>50 (222)<br>50 (222) | <br>75 (334)<br>75 (334) | <br>90 (400)<br>90 (400) | <br>170 (756)<br>130 (579) |
| Puncture Resistance, lb. (N) | ASTM D 4833 | 50 (222) | 55 (245) | 60 (267) | 110 (490) |
| Maximum Use Temperature, °F (°C) | | 180 (82) | 180 (82) | 180 (82) | 180 (82) |
| Minimum Use Temperature, °F (°C) | | -70 (-57) | -70 (-57) | -70 (-57) | -70 (-57) |

(1) G/B = Grey/Black, B/B = Black/Black
(2) Machine Direction
(3) Transverse Direction

MATERIALS CAPTURE, CONTAINMENT, STORAGE

CROSS-REFERENCE TO RELATED APPLICATIONS

The application is entitled to the benefit of the filing date of the prior-filed provisional application No. 61/888,453, filed on Oct. 8, 2013.

STATEMENT REGARDING FEDERALLY SPONSORED RESEARCH OR DEVELOPMENT

Not applicable.

FIELD OF THE APPLICATION

The application relates generally to devices, systems and methods for capturing, containing, storing materials such as fluids and solids.

BACKGROUND

Secondary spill containment involves the capture and containment of discharged materials such as liquids and solids. Commercially, secondary spill containers are often employed to help prevent discharged materials from contaminating one or more objects or environments near the discharge source. Common secondary containment devices include drip pans, pad or tarp materials, absorption materials, spill berms, and the like to capture and/or contain liquids and/or solids discharge from sources such as oil-filled equipment, fuel tanks, truck washing decks, hydraulic fracturing (or "fracking") equipment, conduits, storage devices or machinery that may discharge liquids and/or solids.

Known containment devices are often susceptible to leakage, especially along corner edges of rectangular shaped containers that are assembled from various parts. Such containers are difficult to transport intact and often require several man hours of on-site assembly prior to use.

Overcoming the above disadvantages is desired.

SUMMARY

The present application is directed to a travelable container including (1) a first member defining the outer surface and inner surface of the container and (2) one or more second members housed within the first member forming the perimeter of the container; wherein the one or more second members include perforated seams.

The present application is also directed to a travelable container including (1) a first member defining the outer surface and inner surface of the container; (2) a plurality of second members housed within the first member forming the perimeter of the container; and (3) one or more anchoring members attached to the first member.

The present application is also directed to a travelable container including (1) a planar cross shaped first member; and (2) a plurality of perimeter forming plank type second members; wherein the second members are encased within the first member in a manner effective to provide a seamless inner surface of the container operationally configured to hold one or more liquids, solids, and combinations thereof.

BRIEF DESCRIPTION OF THE SEVERAL VIEWS OF THE DRAWINGS

FIG. 13 is a table listing properties of a suitable first member.

DESCRIPTION OF THE INVENTION

Figure 1:
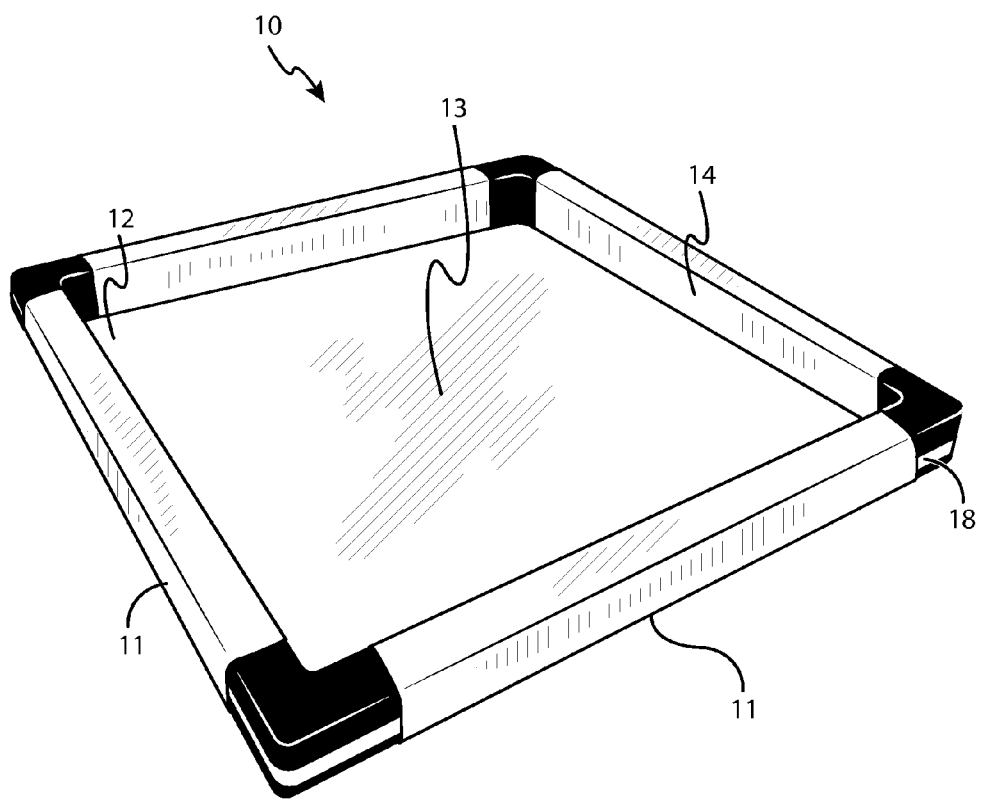
FIG. 1 is a perspective view of an embodiment of an assembled container of this application.

It has been discovered that a container for collecting materials such as liquid and solid discharge or spill materials may be provided in an assembled, easily transportable, stackable, ready for use, continuous liquid sealed configuration. Heretofore, such a desirable achievement has not been considered possible, and accordingly, the system, device and method of this application measure up to the dignity of patentability and therefore represents a patentable concept.

Before describing the invention in detail, it is to be understood that the present system, device and method are not limited to particular embodiments. It is also to be understood that the terminology used herein is for the purpose of describing particular embodiments only, and is not intended to be limiting. As used in this specification and the appended claims, the term "secondary containment" refers to a barrier methodology to capture and/or contain fluids and/or solids including, but not necessarily limited to discharges, leaks or spills from a primary storage container and the like. In operation, secondary containment devices or secondary containers help guard against contamination of surface water, groundwater, and soils and reduces worker exposure to substances captured therein. Secondary containment devices are typically required wherever regulated substances are being handled and stored in tanks, vehicles, totes, drums, small pails, or other containers or machines. As used herein, the acronym "EPA" is an abbreviation for the "Environmental Protection Agency" of the United States of America. Herein, the acronym "NPDES" is an abbreviation for "National Pollutant Discharge Elimination System." The acronym "OSHA" is an abbreviation for the "Occupational Safety and Health Administration" of the United States of America. Herein, 40 CFR part 112 of the United States Clean Water Act, may also be referred to as the Spill Prevention Control and Countermeasures (SPCC) regulations. The term "travelable" herein refers to a container that is able to be passed or traversed or crossed by a land based vehicle in a nondestructive manner.

In one aspect, the application provides portable materials discharge and spill containers (1) resilient to ultra-violet radiation exposure and (2) having puncture resistant qualities. The containers may be assembled and/or used in one location and folded on itself for transport to a second location without disassembly of the container component parts while maintaining leak proof seals of the inner surface of the containers.

In another aspect, the application provides a container including a perimeter defined by one or more resilient members encased within a first member skin of the container, each resilient member being defined by a perforated seam disposed along the resilient member. The perforated seam may be a top down perforated seam or a side through perforated seam. The one or more resilient members are encased within the first member in a manner effective to provide a seamless inner surface of the container.

In another aspect, the application provides a container including a perimeter defined by one or more resilient materials, each resilient member being defined by a perforated seam of one or more apertures disposed along the resilient member, the apertures being collapsible when the resilient materials are deformed.

In another aspect, the application provides a rectangular container including outer corners of about 90.0 degrees.

In another aspect, the application provides portable spill containers that may be effective to (1) reduce disposal costs related to discharged liquids and solids, (2) reduce workplace hazards, (3) protect other on-site assets, (4) increase resale value of property where implemented, (5) reduce a facility or workplace's liability risk, (6) promote materials recovery and/or reclamation, (7) reduce costs associated with liquids and/or solids cleanup and/or maintenance, (8) prevent or reduce soil, surface water, and groundwater contamination, (9) lower insurance premiums.

In another aspect, the application provides containers including sidewalls constructed from one or more resilient materials operationally configured to return to its original shape after a vehicle or other force is applied to the sidewall material to deform the material for a given period of time.

In another aspect, the application provides a light weight flexible container operationally configured to be folded and returned back to an open containment ready configuration as desired.

In another aspect, the application provides vehicular drive on or drive through containers.

In another aspect, the application provides containers including anti-slip surfaces operationally configured to form seamless inner surfaces of the container.

In another aspect, the application provides containers such as liquid berms constructed from one or more materials defined by anti-slip surfaces and operationally configured to form seamless inner surfaces of the container.

In another aspect, the application provides secondary containers built to scale and operationally configured for a variety of liquid and solid containment applications.

In another aspect, the application provides spill containers that are EPA 40, OSHA, CFR 264.175 and NPDES compliant as such is understood by skilled artisans familiar with the laws and regulations of the United States of America for such items. The application further provides spill containers in compliance with standards according to the United States Department of Transportation and United States military standards.

In another aspect, the application provides a container that may be placed under trucks/trailers, generators, compressors, small tanks, hose/pipe connections and other liquids and/or solids storage type equipment.

In another aspect, the application provides a container including malleable wall forming components.

In another aspect, the application provides a secondary containment system or device constructed from one or more materials chemically compatible with the substance(s) to be captured and/or contained therein. A suitable secondary containment system or device may be operationally configured to capture and/or contain organic solvents discharged, spilled or otherwise purposefully placed therein. A suitable secondary containment system or device may also be operationally configured to capture and/or contain inorganic nonaqueous solvents discharged, spilled or otherwise purposefully placed therein.

In another aspect, the application provides a secondary containment system or device operationally configured to hold a volume of liquids and/or solids from about 1.0 percent up to about 100.0 percent the volume capacity of a corresponding primary storage unit housing target containment liquids and/or solids. In another example, the application provides secondary containment devices with side walls from about 2.54 cm to about 45.72 cm (about 1.0 inches to about 18.0 inches) in height operationally configured to hold from about 10.0 percent to about 25.0 percent the volume of liquids and/or solids of a corresponding primary storage unit.

In another aspect, the application provides containers operationally configured for use according to one or more of the following: (1) washdown applications, (2) drip pad applications, (3) overturned truck spill capture and containment, (4) oil boom containment, (5) pipeline repair and spill capture and containment, (6) emergency spill containment, (7) drum containment, (8) railcar spill capture and containment and (9) tank spill capture and containment.

In another aspect, the application provides open top containment units for temporary capture and storage of spills, leaks and other discharge of one or more liquids and/solids.

In another aspect, the application provides a liquid container including heat sealed edges and/or seams.

In another aspect, the application provides a rectangular liquid containment device including reinforced corners having support material attached thereto for providing seamless and/or sealed surfaces. In another aspect, the reinforced corner members include one or more anchoring members.

The present application also provides a safeguard containment measure used to prevent accidental releases, discharges, seepage, spills of toxic or hazardous substances to the ambient soil, water and groundwater. A suitable containment measure may include providing a structure that is chemically compatible to hold one or more toxic or hazardous fluid/solid substances until disposed of as desired. A suitable approach may also include providing containers for redirecting releases, discharges, seepage, spills away from water or other target areas.

In another aspect, the application provide a container system or device that may be altered dimensionally and/or in materials of construction to match or otherwise correspond to one or more on-site specific conditions and/or requirements without unnecessarily increasing container costs.

In another aspect, the application provides a container system or device that may be configured according to one or more factors including, but not necessarily limited to the identity of the liquids and/or solids to be held within the container system or device, weather conditions, intended timeframe of use, the weight of vehicle(s) and other objects that may travel over or across the container system or device, vandalism considerations, and the need to identify vehicle operators as to the location of a container system or device in low light conditions.

In another aspect, the application provides a container system or device covering an area large enough to capture liquid spray traveling out a predetermined distance from one or more discharge points.

In another aspect, the application provides a container system or device provided with a tracking device attached thereto for theft prevention, tracking and recovery purposes. Suitable tracking devices include, but are not necessarily limited to global positioning system ("GPS") tracking devices.

In another aspect, the application provides a container system or device provided with anti-counterfeit technology including, but not necessarily limited to radio frequency identification ("RFID") chips attached thereto.

In another aspect, the application provides a container system or device provided with tracking or identification technology including, but not necessarily limited to optical machine-readable data such as one dimensional barcodes, matrix two dimensional barcodes and Quick Response Codes, radio frequency identification ("RFID") chips attached thereto.

In another aspect, the application provides a one piece outer surface configuration for spill prevention and containment purposes.

In another aspect, the application provides foam filled containers operationally configured for pneumatically filled tires and/or vehicle tracks to cross over the foam without harming the foam.

In another aspect, the application provides a container having one or more reflective surfaces. Reflective surfaces may be provided in the form of an outer skin materials or as additional add-on reflective material.

In another aspect, the application provides a container including one or more illumination sources, including but not necessarily limited one or more light-emitting diodes ("LED"), chemiluminescence products, and combinations thereof.

In another aspect, the application provides a container including a liquid volume scale disposed along an inner surface of a side wall or perimeter wall of the container.

In another aspect, the application provides a container including a first member serving as an outer skin comprising an anti-skid textured surface.

In another aspect, the application provides a container having an outer surface including sealing members operationally configured to seal edges of the first member to itself.

In another aspect, the application provides a container including a perimeter including wall forming members defined by perforated seams. The perforated seams may include perforations having a maximum inner width up to about 80.0 percent the width of the wall forming members.

In another aspect, the application provides a container including a first member constructed from a bendable liquid resistant material and second members forming the perimeter of the container constructed from one or more resilient materials.

DISCUSSION

With reference now to FIG. 1, a simplified illustration of a containment device or container 10 is provided. As shown, the container 10 suitably includes a first member having (1) an outer surface 11 defined by outer perimeter walls and a bottom surface that is operationally configured to directly contact a support surface such as a floor or the ground and (2) an inner surface 12 oriented in a manner effective to hold and maintain liquids and/or solids therein. In one embodiment, the inner surface may include a bottom surface or floor 13 and a raised perimeter inner surface 14 or "raised surface" extending from the floor 13 as desired. In another embodiment, the inner surface of the container 10 may include a bowl shape, a slope shape, or a curved shape. For example, the inner surface 12 may be configured in a manner necessary to hold and maintain liquids on a particular unlevel surface.

In the simplified embodiment of FIG. 1, the inner surface 12 is shown as a substantially planar bottom floor 13 defined by a raised surface 14 along the inner perimeter forming angles about 90.0 degrees with the bottom surface. In other embodiments it is contemplated that the raised surfaces 14 may extend from the floor 13 forming an angle there between from about 30.0 degrees to about 150.0 degrees. In still another embodiment, the floor 13 may be substantially non-planar. In still another embodiment, the floor 13 may be operationally configured to conform to the shape of a corresponding surface supporting the container 10 during operation, e.g., jagged ground, curved ground at an outdoor location. Likewise, the raised surface 14 may be substantially planar, substantially non-planar, curved, jagged, and combinations thereof as desired. As shown, the raised surface 14 may form a wall type outer wall perimeter and inner perimeter defining the number of sides of the container 10, e.g., rectangular four-sided containers, triangular three-sided containers, hexagonal six-sided containers, etc. In an embodiment providing a corner free container 10, e.g., a circular or oval shaped container 10, the raised surface 14 is suitably provided as a continuous perimeter member. With particular reference to FIG. 1, the container 10 includes a substantially planar floor 13 and four substantially planar raised surfaces 14, the planes of the raised surfaces 14 lying substantially perpendicular to the plane of the floor 12, e.g., about 90.0 degrees.

Figure 2:
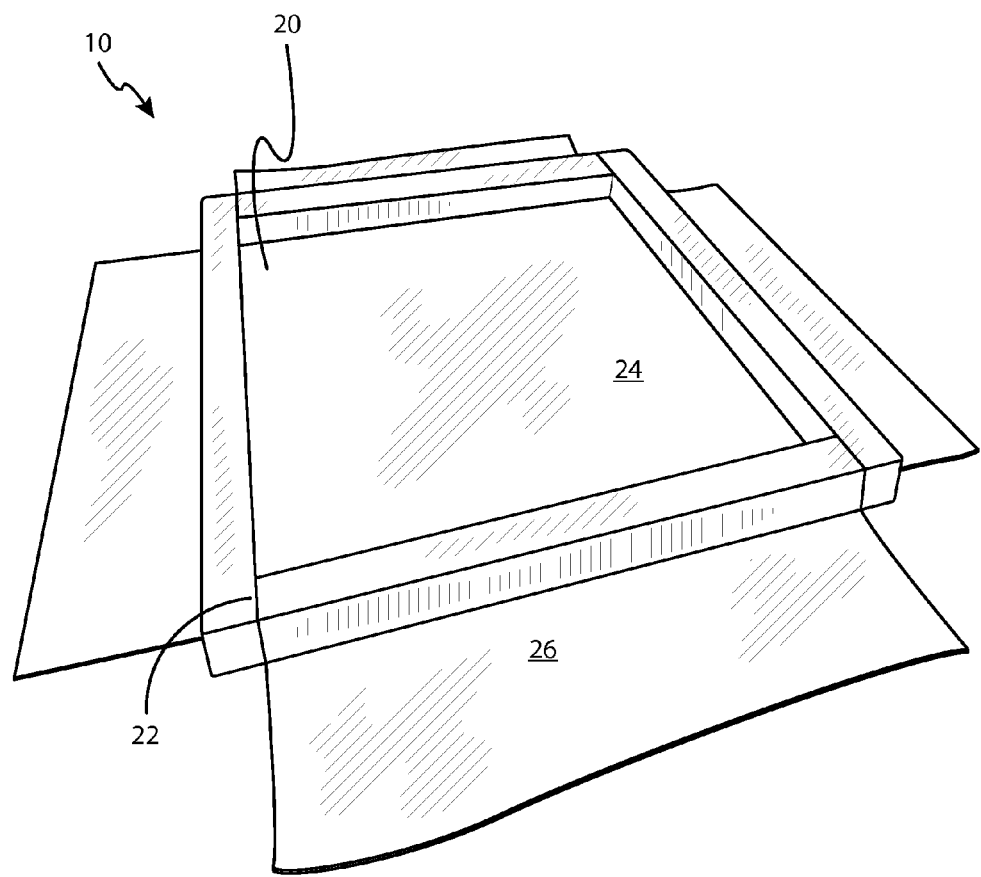
FIG. 2 is a perspective view of an embodiment of an unassembled container of this application.
Figure 3:
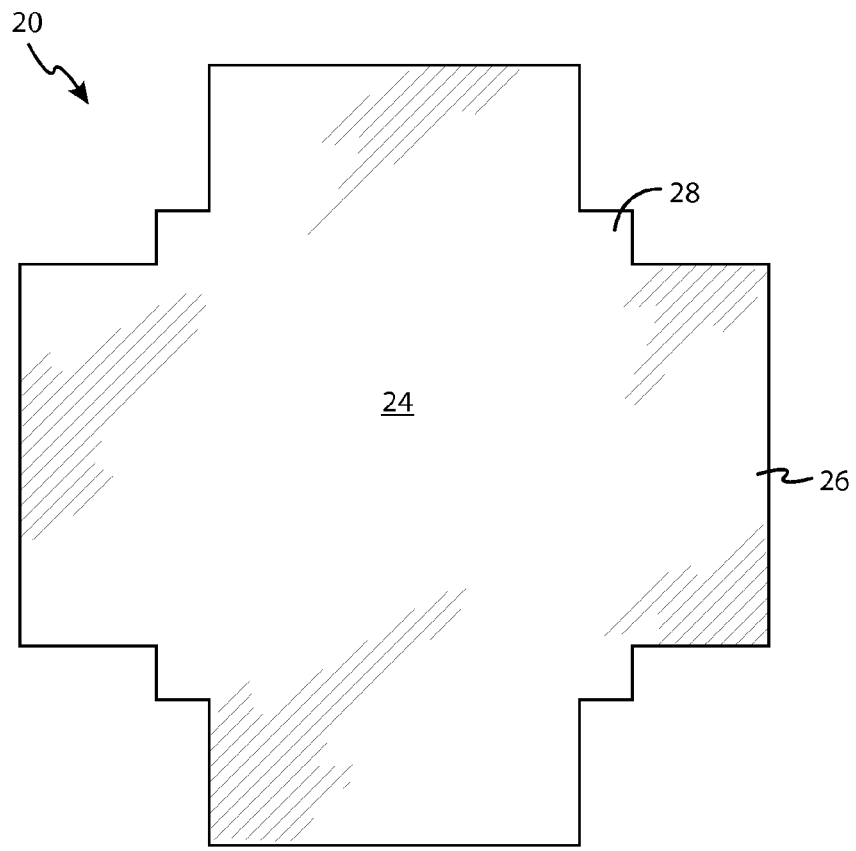
FIG. 3 is a plan view of an embodiment of a first member of a container of this application.
Figure 4:
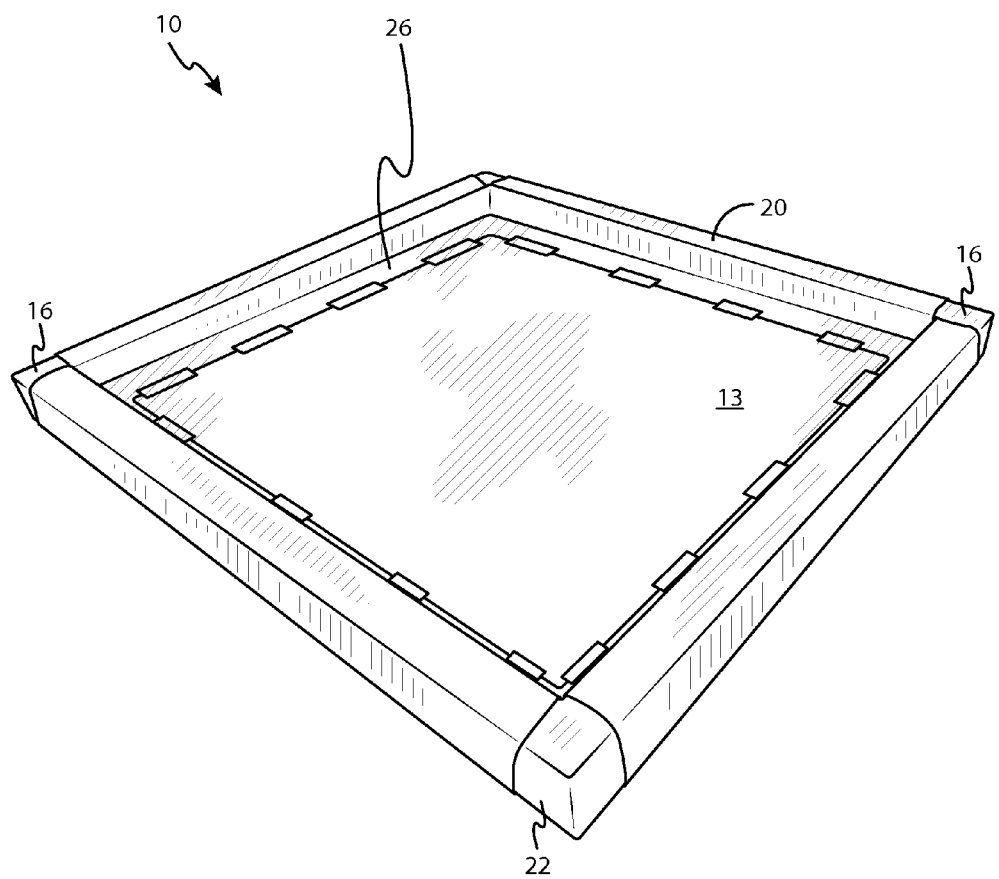
FIG. 4 is a perspective view of an embodiment of a partially assembled container of this application including exposed corner sections.

Turning to FIG. 2, two of the primary components of an exemplary container 10 are shown in a preassembly orientation. The container 10 suitably includes a first member 20 constructed from one or more flexible or bendable materials operationally configured to form the outer surface 11 and inner surface 12 of the container 10. The container 10 also suitably includes one or more second members 22 disposed along the perimeter of a central rectangular portion 24 of the first member 20, the one or more second members 22 being operationally configured to provide an outer perimeter framework of the container 10 (see the raised surfaces 14 discussed above). Turning to FIG. 3, an exemplary first member 20 includes a substantially cross shape pattern operationally configured to be set upon a support surface, e.g., a floor, a work bench, table top or other work surface, as desired or otherwise required. In this particular embodiment, the first member 20 includes a central rectangular portion 24 defined by four dog ears 28 disposed between four extension members 26. In operation, the four extension members 26 are operationally configured to be directed inward and over the one or more second members 22 in a manner effective to form seals enclosing the one or more second members 22 therein with corners 16 exposed as shown in FIG. 4.

Without limiting the materials of construction, the first member 20 and second member 22 are suitably constructed from one or more materials including but not necessarily limited to those materials resistant to chipping, cracking, deformation as a result of ozone, weathering, outdoor heat, moisture, other outside mechanical and chemical influences. As desired, the first and second members 20, 22 may also be constructed from one or more fire retardant materials. At a minimum, the first and second members 20, 22 are suitably constructed from one or more materials effective for use according to one or more particular operations and/or according to one or more regulatory type requirements or standards where required. In addition, the first and second members 20, 22 may be constructed from one or more recycled products.

Suitable first member 20 materials may include, but are not necessarily limited to naturally occurring polymeric materials and chemical modifications thereof, synthetic polymeric materials, leather, mineral source materials, and combinations thereof. Suitable naturally occurring polymeric materials include, but are not necessarily limited to cellulose, starch, lignin, chitin, various polysaccharides, shellac, amber, wool, silk, natural rubber, and combinations thereof. Suitable synthetic polymeric materials include, but are not necessarily limited to thermoplastics, thermosets, elastomers, synthetic fibers. Particular synthetic polymers may include, but are not necessarily limited to low density polyethylene, high density polyethylene, polypropylene, polyvinyl chloride, polystyrene, nylon, polytetrafluoroethylene, thermoplastic polyurethanes, polychlorotrifluoroethylene, para-aramid fiber, and combinations thereof. Polymeric materials may be provided in the form of one or more geosynthetic materials. Suitable geosynthetic materials include, but are not necessarily limited to geomembranes, geotextiles, geogrids, geocomposites, geonet, and combinations thereof. In one example, impermeable geomembrane material may be employed.

Polymeric material may be provided in film/sheet form and may include laminated materials and/or extrusion coatings as desired. As understood by the skilled artisan, polymeric sheets may be formed from raw materials including, but not necessarily limited to polymer resin, antioxidants, plasticizers, fillers, carbon black, lubricants, and combinations thereof.

Polymeric material(s) used for a given application may be determined according to one or more mechanical properties, for example, (1) low tensile strength and elongation, (2) tear resistance, (3) impact resistance, (4) puncture resistance, (5) interface shear strength, (6) anchorage strength, (7) stress cracking, and combinations thereof. Likewise, polymeric material(s) used for a given application may be determined according to one or more endurance type properties, for example (1) ultraviolet light exposure, (2) radioactive degradation, (3) biological degradation, (4) chemical degradation, (5) thermal behavior (hot and/or cold), (6) oxidative degradation, and combinations thereof. In addition, suitable polymeric materials may be seamed or otherwise connected to itself as desired.

Figure 5:
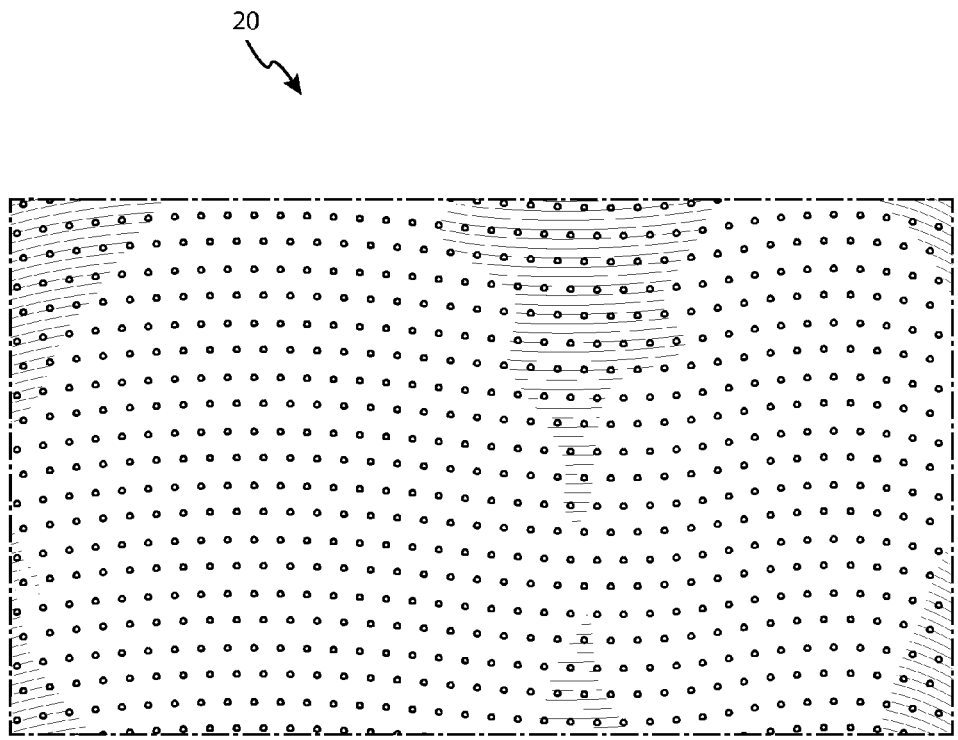
FIG. 5 is a perspective view of a section of a first member having a textured surface.

In one embodiment, the first member 20 may include a scrim material or woven coated material as understood by the skilled artisan. In another embodiment, the first member 20 may include a geomembrane constructed from high-density polyethylene ("HDPE"), linear low-density polyethylene ("LLDPE"), polyvinyl chloride ("PVC"), flexible polypropylene ("FPP"), chlorosulphonated polyethylene ("CSPE"), ethylene propylene diene terpolymer ("EPDM"), and combinations thereof. In one particular embodiment, the first member 20 may include a geomembrane constructed from linear low-density polyethylene ("LLDPE") resins. In another particular embodiment, the first member 20 may include high-density polyethylene ("HDPE"). In one particular embodiment, the first member 20 may include scrim reinforced polyethylene. In another particular embodiment, the first member 20 may include a LLDPE geomembrane including a substantially smooth surface or a textured surface as shown in FIG. 5, which provides a non-skid anti-slip surface. In still another particular embodiment, the first member 20 may include high strength polyethylene film and heavy-duty scrim reinforcement, e.g., an extrusion laminated reinforced film made of two layers of LLDPE and one layer of polyester string reinforcement scrim as understood by the skilled artisan. Although the container 10 of this application may be built to scale, for most discharge capture and containment applications a suitable first member 20 has a thickness from about 2.0 mm to about 20.0 mm (about 0.079 inches to about 0.79 inches). In addition, the first member 20 may be provided in any color or color combination as desired. In one particularly advantageous embodiment, the first member 20 may be constructed from a LLDPE geomembrane having a gray color on the inner surface 12, which is effective to reduce heat buildup compared to a black colored surface and which is less reflective than a white colored surface in bright environments.

As understood by the skilled artisan, LLDPE geomembrane products are extremely flexible, with high elongation, tremendous tear resistance and bursting strength. A high carbon black content in LLDPE geomembrane provides excellent protection from ultra-violet rays and harsh weather. LLDPE geomembrane products of this application may also be seamed together to protect against leakage and seepage of the container 10. Herein, the seaming together of polymeric geomembrane sheets involves reorganizing the polymer structure (by melting or softening) of surface portions of the sheets, whereby after the application of pressure, the two sheets may be bonded together. Ideally, seaming two polymeric geomembrane sheets should result in no net loss of tensile strength across the two sheets, whereby the joined sheets perform as one single geomembrane sheet.

Exemplary geomembrane sheet performance qualities for the purposes of this application are shown in Table 1 below, which lists several exemplary standardized tests familiar to persons of ordinary skill in the art of geomembrane sheets.

TABLE 1

A. American Society for Testing and Materials (ASTM)
1. D 1004 Test Method for Initial Tear Resistance of Plastic Film and Sheeting
2. D 1238 Standard Test Method for Flow Rates of Thermoplastics by Extrusion Plastometer
3. D 1505 Test Method for Density of Plastics by the Density-Gradient Technique
4. D 1603 Test Method for Carbon Black in Olefin Plastics
5. D 3895 Standard Test Method for Oxidative-Induction Time of Polyolefins by Differential Scanning Calorimetry
6. D 4218 Standard Test Method for Determination of Carbon Black in Polyethylene Compounds
7. D 4833 Standard Test Method for Index Puncture Resistance of Geotextiles, Geomembranes, and Related Products
8. D 5199 Standard Test Method for Measuring Nominal Thickness of Geotextiles and Geomembranes
9. D 5397 Standard Test Method for Evaluation of Stress Crack Resistance of Polyolefin Geomembranes Using Notched Constant Tensile Load Test
10. D 5596 Standard Test Method for Microscopic Evaluation of the Dispersion of Carbon Black in Polyolefin Geosynthetics
11. D 5994 Standard Test Method for Measuring Core Thickness of Textured Geomembranes
12. D 6392 Standard Test Method for Determining the Integrity of Nonreinforced Geomembrane Seams Produced Using Thermo-Fusion Methods
13. D 6693 Standard Test Method for Determining Tensile Properties of Nonreinforced Polyethylene and Nonreinforced Flexible Polypropylene Geomembranes TABLE 1-continued 14. D 7240 Standard Practice for Leak Location using Geomembranes with an Insulating Layer in Intimate Contact with a Conductive Layer via Electrical Capacitance Technique (Conductive Geomembrane Spark Test)
B. Geosynthetic Research Institute
  1. GRI GM 13 Test Properties, Testing Frequency and Recommended Warranty for High Density Polyethylene (HDPE) Smooth and Textured Geomembranes
  2. GRI GM 17 Test Properties, Testing Frequency and Recommended Warranty for Linear Low Density Polyethylene (LLDPE) Smooth and Textured Geomembranes Without limiting sources of commercial availability, a suitable LLDPE geomembrane sheet or film is commercially available from the following sources: Geo-Synthetics, LLC, which can be found on the internet at www.geo-synthetics.com; and In-Line Plastics, LC, Houston, Tex., U.S.A.

Suitable second member 22 materials may include, but are not necessarily limited to metals, polymeric materials, woods, composite materials, and combinations thereof having hydro-phobic properties, impervious to infestation by insects and parasites. Any metal may be employed as desired according to weight requirements, if any. Metal second members 22 may be provided as solid members, hollowed members or partially hollowed members. Suitable metals may include, but are not necessarily limited to steel, aluminum, lead, copper, and combinations thereof. Suitable woods may also be provided as solid members, hollowed members or partially hollowed members. In embodiments where a container 10 is operationally configured to contain one or more liquids, suitable wooden second members 22 are resistant to the one or more liquids either in a natural state or as treated wood. In one simplified embodiment, the second members 22 may include wooden railroad ties as understood by the skilled artisan.

Figure 6:
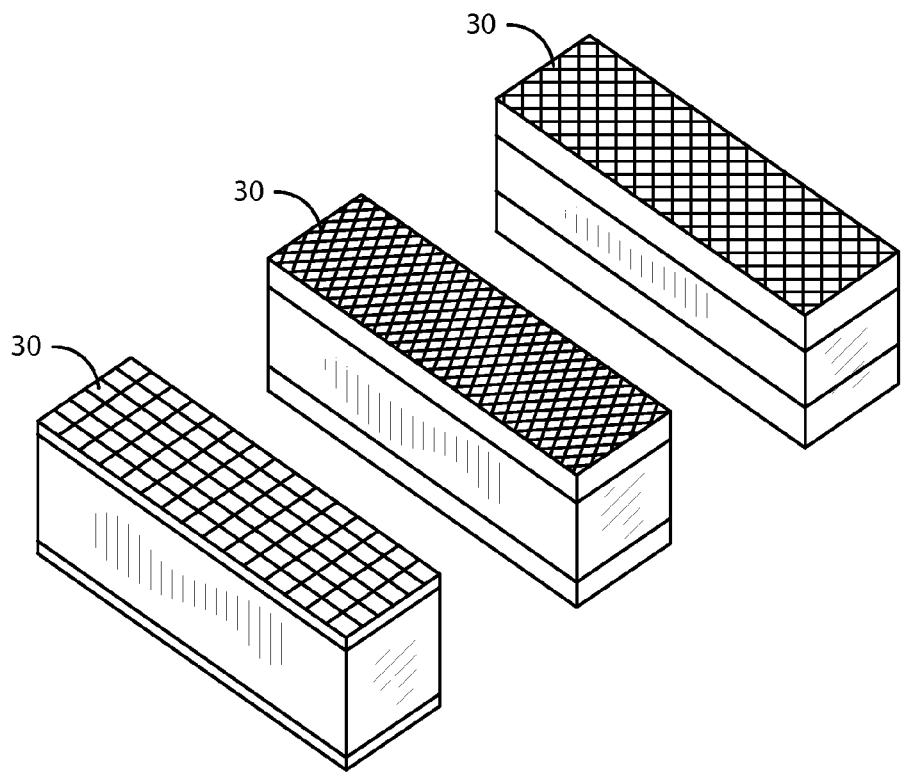
FIG. 6 is a perspective view of exemplary sandwich beams.

A suitable composite second member 22 may include a sandwich beam as the phrase is understood by the skilled artisan. Suitable sandwich beams may include a foam core sandwiched by a metal, polymeric material, composite(s), wood, and combinations thereof. Other core materials may include cementitious compositions, natural latex, fly ash, sulfur, zinc oxide, and combinations thereof. Exemplary sandwich beams 30 are shown in FIG. 6. Another suitable composite second member 22 may be constructed from cement-polymer composite materials. Other suitable composite second member 22 materials of construction may include, but are not necessarily limited to ceramic composites, cardboard materials, glass fiber reinforced plastic ("GFRP"), graphite fibers in an epoxy matrix, graphite fibers in a carboy matrix (knows as carbon-carbo to the skilled artisan), fiberglass in an epoxy matrix, and combinations thereof.

Suitable polymeric materials used in second member 22 construction may include, but are not necessarily limited to rubbers, plastics, open cell foam, closed cell foam and combinations thereof. Open cell and closed cell foam may be provided in sheet form or plank form and include one or more of the following non-limiting qualities: adhesiveness, anti-microbial, water resistant, and anti-static. Suitable open cell foam may include, but is not necessarily limited to reticulated polyurethane foam, reticulated ceramic foam, reticulated metal foam, and combinations thereof. Suitable closed cell foam may include, but is not necessarily limited to expanded polyethylene foam ("EPE"), cross linked polyethylene foam, polystyrene foam, neoprene rubber, gum rubber, and combinations thereof. As stated, the container 10 of this application may be built to scale. However, common commercially available closed cell foam is available in plank type form at lengths up to about 2.74 meters (about 9.0 feet).

Figure 7A:
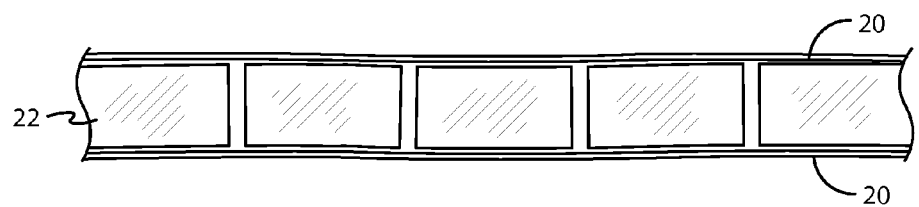
FIG. 7A is a phantom view of a section of a side wall of a container including plank shaped second members set within a first member.
Figure 7B:
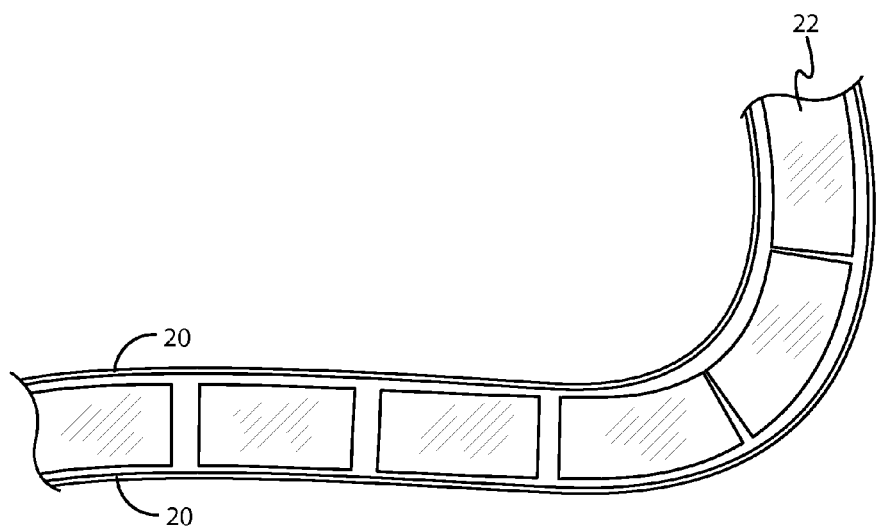
FIG. 7B is a view of the side wall of FIG. 7A in a bent position.

Second members 22 may be provided in any configuration as desired to achieve one or more particular container 10 purposes. For example, second members 22 in sheet and/or plank form may be stacked or otherwise combined in any combination of sizes and shapes to provide a particular raised surface 14 of the container 10. Another feature of the second members 22 of this application includes the ability to bend or fold the second members 22 in a manner effective to fold the container for storage and/or transportation purposes. With attention to FIGS. 7A and 7B, in one simplified embodiment including plank shaped second members 22, one or more sides of a container 10 may employ a plurality of second members 22 end to end with spacing or gaps there between to provide travel distance when bending the side of the container 10. In another embodiment, it is contemplated that a plurality of second members 22 may be hinged or otherwise attached along adjacent edges in a manner effective to allow for bending of a side of a container 10.

Figure 8A:
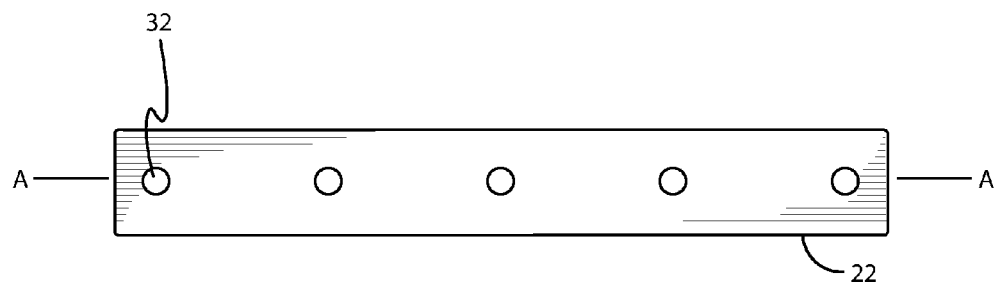
FIG. 8A is a view of a second member having a perforated seam.
Figure 8B:
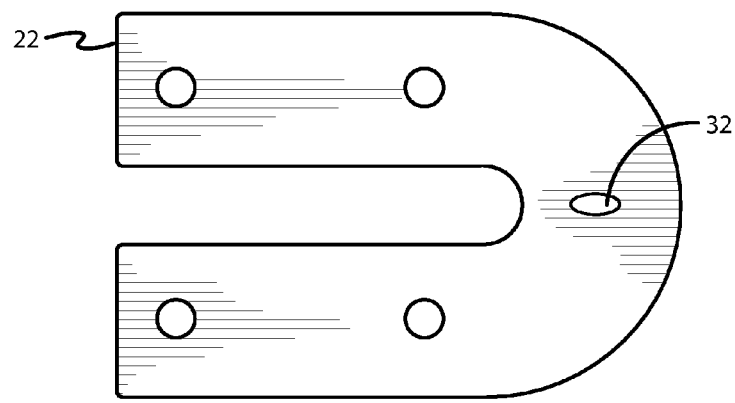
FIG. 8B is a view of the second member of FIG. 8A in a folded position.
Figure 8C:
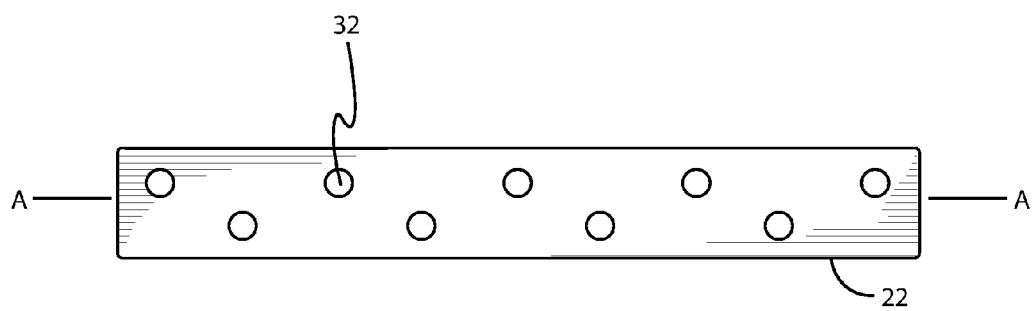
FIG. 8C is a view of another embodiment of a second member having a perforated seam.

As shown in the simplified illustration of FIGS. 8A and 8B, a second member 22 may include a perforated seam A-A comprising one or more perforations 32 in substantially linear alignment, the perforated seam A-A being operationally configured to allow one or more second members 22 to bend or fold, the perforations 32 being collapsible as shown in FIG. 8B. In another embodiment, a perforated seam A-A may comprise a plurality of staggered or offset perforations 32 as shown in FIG. 8C. Suitably, perforations 32 are offset and spaced apart according to the size and shape of the second member 22 and/or the desired bend angle of the second member 22. Other perforated seam A-A arrangements are also contemplated herein.

Suitable perforations 32 may include apertures through second members 22 operationally configured to provide a perforated seam in either a top down or side through arrangement. In another embodiment, perforations may include partial cut-outs to a particular depth operationally configured to provide a desired bend of a second member 22. In one embodiment, cut-outs may include holes or cavities in the second members 22. In another embodiment, cut-outs may include slits, cuts, grooves, channels, indentations, and the like disposed across the width of the second members 22. Perforations may also be provided in a combination of apertures and/or partial cut-outs and/or slits, cuts, grooves, channels, indentations, and the like. Apertures may be provided in a shape and maximum inner width as desired. Likewise, partial cut-outs may be provided in a shape, maximum inner width and depth as desired. Suitable shapes include circular and multi-sided shapes. For secondary containment purposes, suitable apertures 32 comprise a maximum inner width from about 2.54 cm to about 7.62 cm (from about 1.0 inch to about 3.0 inches). Depending on the material of construction of a particular second member 22, the perforated seams of this application may be operationally configured to allow a foam second member 22 to bend a greater angle than the same foam second member 22 void of a perforated seam. In the alternative, a perforated seam may be operationally configured to allow a foam second member 22 to bend more easily upon application of a known force compared to the same foam second member 22 void of a perforated seam. It is further contemplated that a perforated seam may reduce stress placed on second member 22 material of construction when the second member 22 is being bent or otherwise manipulated thereby prolonging the useful life of second members 22 compared to foam second members 22 void of a perforated seam. A simplified preassembly orientation of a container 10 including second members 22 with perforated seams is shown in FIG. 9.

In one implementation, a container 10 may be employed for applications where fluid leakage is a non-issue, e.g., operations for capturing and/or holding solid materials. In another implementation where the container 10 is intended to contain one or more liquids, the second members 22 may be secured, tacked, adhered or otherwise attached to the first member 20 in a manner effective to (1) prevent sliding of the second members 22 and/or (2) provide a seal where the first and second members 20, 22 are secured. In one embodiment, the second members 22 may be attached to the first member 20 via one or more adhesive materials. In another embodiment, including a first member 20 and second members 22 constructed from polymeric material(s), the second members 22 may be fused to the first member 20 via heat, e.g., using a heat gun or flame until the first and second members 20, 22 reach their respective melting points, which may be similar depending on the materials of construction. Likewise, the first and second members 20, 22, as well as other materials, may be adhered via plastic welding or extrusion welding as the terms are understood by the skilled artisan. In addition, various material(s) may be sealably attached to (1) the floor 13 along the edges of the extensions 26 and (2) the exposed corners 16 of the second member 22 to provide a container 10 with a fluidly sealed inner surface 12. As an example, tacky industrial tape including, but not necessarily limited to polyethylene tape may be applied to one or more target areas along the outer and inner surfaces 11, 12 of the container 10. To promote an effective seal along first member 20 having textured surfaces, tape may be applied to the textured surface via a roller or similar device operationally configured to maximize surface area adhesion between the tape and surface of the first member 20—a textured surface having a greater surface area than a substantially smooth surface. One suitable roller includes a silicone roller or silicone seam roller as the terms are understood by the skilled artisan. One suitable tape may include a polypropylene mesh fiber backing to promote surface conformity and strength. A suitable commercially available tape includes, but is not necessarily limited to TAPECOAT® M50 Black.

It is further contemplated that a container 10 be constructed from a plurality of first member 20 sections, e.g., where the desired dimensions of the container 10 are greater than the dimensions of available first member 20 materials. Under such scenario, multiple first member 20 sections may be sealably attached together as desired. In an embodiment where the first member 20 is constructed from one or more polymeric material sections, multiple sections may be sealably attached via a wedge welding process as the term is understood by persons of ordinary skill in the art. All seals of the containers 10 discussed herein may be tested via air pressure prior to implementation in the field as desired.

Figure 9:
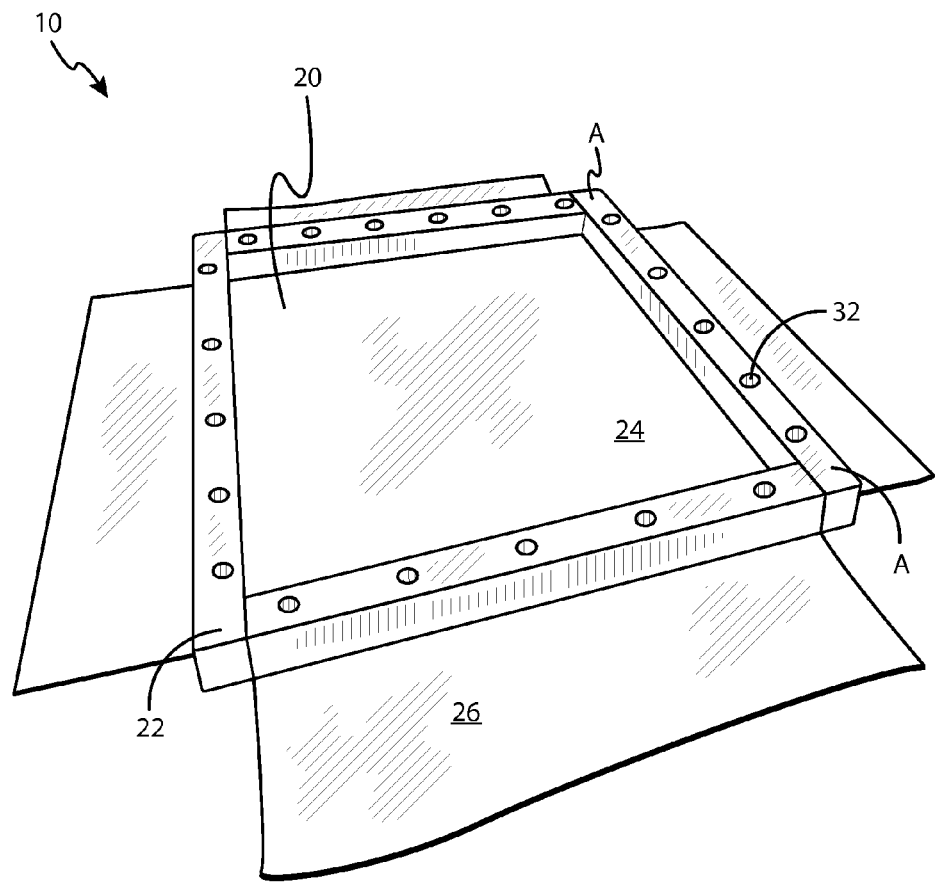
FIG. 9 is a perspective view of an embodiment of an unassembled container of this application.

In one implementation, a container 10 as shown in FIGS. 4 and 9 may be flipped over (see FIG. 10) wherein the bottommost outer surface 11 of the container 10 is operable as the inner surface 12 (floor 13 and raised surface 14) of the container 10. Thus, the exemplary containers 10 of FIGS. 4, 9, and 10 may be effective for invertible use as desired.

Figure 10:
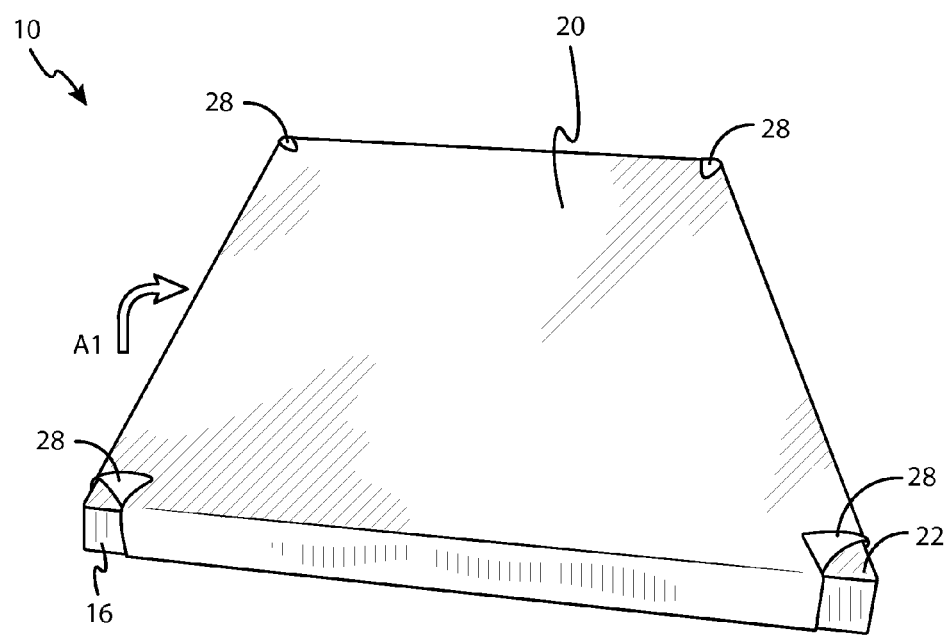
FIG. 10 is a perspective view of an embodiment of a partially assembled container of this application.
Figure 11A:
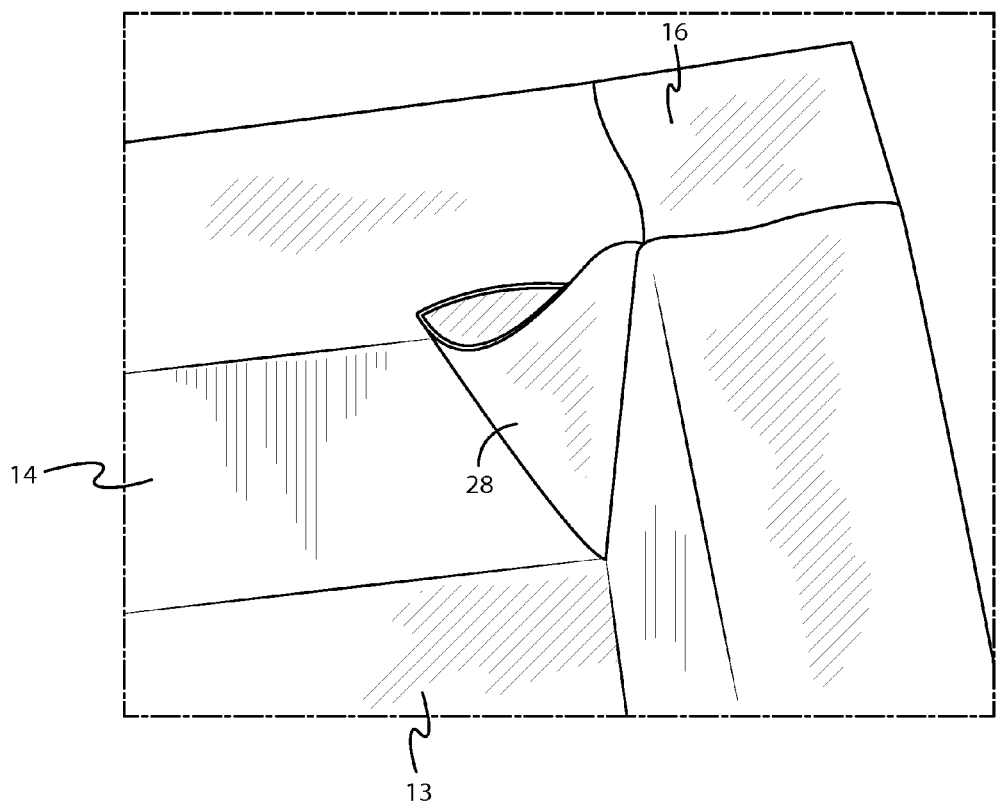
FIG. 11A is a view of an inner surface of a corner of an embodiment of a container of this application.

As FIG. 10 shows, the dog ears 28 previously concealed by the second member 22 (see FIG. 4) become exposed when the container 10 is flipped over onto its other side. Suitably, to form the floor 13 and raised surface 14 the container 10 of FIG. 10 is manipulated by rotating each of the second members 22 inward about 90.0 degrees (see directional Arrow A1), which lowers the first member 20 and repositions the dog ears 28 inward along each of the corners of the raised surface 14 as shown in FIG. 11A. Also, where the second members 22 are oriented preassembly with perforations 32 top down (see FIG. 9), inward rotation of the second members 22 about 90.0 degrees results in a side through orientation of the perforations 32.

Figure 11B:
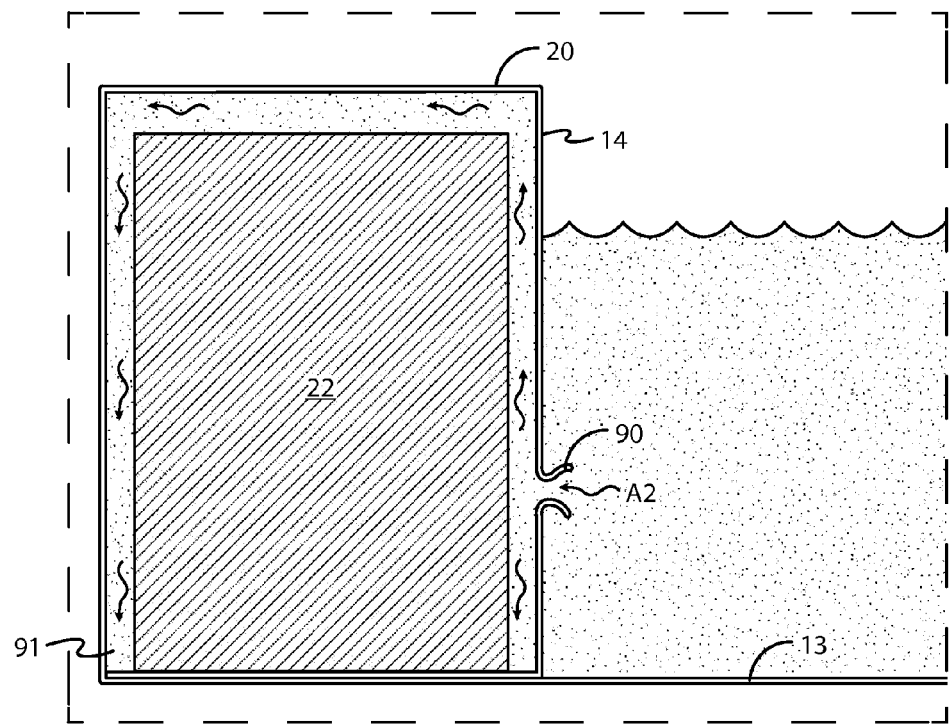
FIG. 11B is a sectional view of an embodiment of a container illustrating a punctured first member and fluid travel through the puncture and around a second member sealed within the first member.

Turning to FIG. 11B, in an embodiment including a second member 22 constructed from non-absorbing material, e.g., closed cell foam, if the raised surface 14 gets punctured (see puncture 90) any fluid held within the container 10 will only fill the space 91, if any, between the first member 20 and the second member 22 (see directional Arrows A2). Non-absorbent second member 22 material may be beneficial in that it reduces the amount of weight added to the container 10 compared to a second member 22 constructed from fluid absorbent material, which may hold fluid therein for a substantial period of time.

In one embodiment, directing extension members 26 inward and over the one or more second members 22 is effective to form a seamless covering of material over each of the corners of the raised surface 14 whereby the dog ears 28 may be sealably secured to the raised surfaces 14 prior to use. In another embodiment, once each of the second members 22 are rotated inward forming the floor 13 and raised surface 14, additional material may be used to reinforce and/or further seal each of the corners of the container 10 (and dog ears 28) as shown in FIG. 1. In one example, sealing members of substantially similar material as the material comprising the first member 20 may be adhered to each corner, including covering and sealing off the dog ears 28 via heat. Once the corners are sealed, the container 10 is seamless providing a sealed leak proof outer and inner surfaces 11, 12.

As desired, the material used to reinforce each of the corners 16 may be provided in a color unlike the color of the first member 20. In the alternative, where the material used to reinforce each of corners includes a substantially similar color as that of the first member 20, the reinforced material may be colored as desired. For example, the reinforcement material may be painted, dyed or stained or a colored tape may be applied to the surface of the reinforcement material. Color differentiation may assist with container 10 visibility in low light environments, for example, by employing reflectors or reflector material 18 against a dark reinforcement material (see simplified illustration in FIG. 1).

Figure 12:
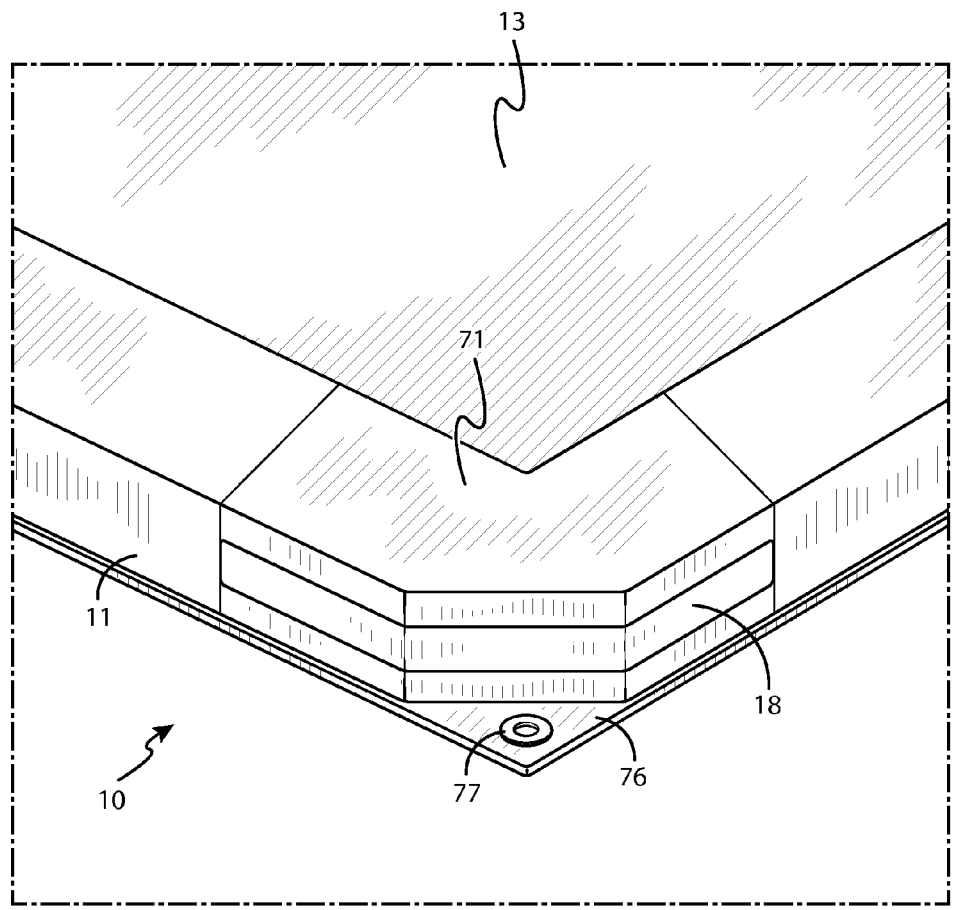
FIG. 12 is a perspective view of another embodiment of a container of this application.

Turning to FIG. 12, in another embodiment a container 10 may include one or more anchoring members 76 attached thereto. As shown, anchoring members 76 may be provided at the junction between perimeter walls. In another embodiment, anchoring members 76 may be employed along the length of the perimeter walls of a container 10 in addition to or in place the junction between the perimeter walls. In one embodiment, anchoring members 76 may include one or more snaps, buckles, tie-offs, hooks, loops, handles, and the like for attaching the container 10 to one or more structures or weighted items in a manner effective to maintain the container 10 in a substantially fixed position along a support surface during use. For example, rope, cable, ties, and other tethering items may be employed for securing the container 10 to one or more structures or weighted items.

In an embodiment where a container 10 is placed upon the earth or penetrable material(s), the anchoring members 76 may include one or more apertures there through for receiving spikes, grounding rods or other earth penetrable items for maintaining the container 10 in a substantially fixed position during use. The earth penetrable items employed may also include collars or the like for sandwiching the anchoring members 76 to the ground. As shown in FIG. 12, apertures may include grommets 77 or eyelets as the terms are understood by the skilled artisan. In still another embodiment, a spike or other earth penetrable item may directed through the material of construction of an anchoring member 76. In still another embodiment, weighted objects may be set atop the anchoring members 76 in a manner effective to maintain the container 10 in a substantially fixed position during use.

Still referring to FIG. 12, anchoring members 76 may include sheet like members attached to the bottom of the container 10 and/or support material 71 depending on the size of these various parts. The anchoring members 76 may be constructed from like or dissimilar material(s) as the corresponding first member 20 and/or corner support material 71. Depending on the materials employed, anchoring members 76 may be attached to the first member 20 and/or support material 71 via using a heat gun, plastic welding or extrusion welding, adhesives, tape, and combinations thereof as described above.

The invention will be better understood with reference to the following non-limiting examples, which are illustrative only and not intended to limit the present invention to a particular embodiment.

Example 1

In a first non-limiting example, a container 10 may be provided with a first member 20 constructed of two sheets of impermeable LLDPE extruded onto both sides of a high tensile strength polyester scrim reinforcing layer. The first member 20 having properties as depicted in FIG. 14.

Example 2

In a second non-limiting example, a container 10 may be provided including a first member 20 having a shape as depicted in FIG. 3 and second members 22 as shown in FIG. 9. The second members 22 being constructed from expanded closed cell polyethylene foam having the following dimensions:
Length: about 2.44 meters (about 8.0 feet)
Height: about 10.16 cm (about 4.0 inches)
Width: about 10.16 cm (about 4.0 inches)
Each second member 22 has a perforated seams A-A with five apertures 32 there through. Each of the apertures 32 has a maximum inner width of about 5.08 cm (about 2.0 inches). The distance between each aperture 32 ranges from about 30.48 cm to about 45.72 cm (from about 12.0 to about 18.0 inches).

Persons of ordinary skill in the art will recognize that many modifications may be made to the present application without departing from the spirit and scope of the application. The embodiment(s) described herein are meant to be illustrative only and should not be taken as limiting the invention, which is defined in the claims.

I claim:

1. A travelable container including:
   a first member constructed from a material and defining the outer surface and inner surface of the container, the entire inner surface including a leak proof surface configuration; and
   one or more second members forming the perimeter of the container; and
   additional material adhered to the corners of the container, the additional material being constructed from substantially similar material as the first member material;
   wherein the one or more second members include perforated seams; and
   wherein the additional material and the first member are operationally configured to provide a leak proof fluid seal about the second members housed therein.

2. The container of claim 1 wherein the perforated seams include one or more perforations providing top down perforated seams or side through perforated seams.

3. The container of claim 1 wherein the perforated seams include one or more apertures in substantially linear alignment.

4. The container of claim 1 wherein the one or more second members are plank shaped having a length defining a longitudinal axis, width and height and wherein the perforated seams include a plurality of offset perforations disposed along the longitudinal axis of the one or more second members.

5. The container of claim 1 wherein the one or more second members are defined by a length, width and height and the perforations of the perforated seams are apertures, each aperture having a depth less than the length of the corresponding second member and equal to the width and height of the second member, the apertures having a maximum inner width about half said second member width and height.

6. The container of claim 1 wherein the perforated seams include one or more perforations in the form of apertures, partial cut-outs, and combinations thereof.

7. The container of claim 1 wherein the entire inner surface includes an anti-skid textured surface.

8. The container of claim 1 wherein the first member includes heat sealed edges.

9. The container of claim 1 further including sealing members operationally configured to provide leak proof seal edges of the first member to itself.

10. The container of claim 1 wherein the one or more second members are constructed from closed cell foam selected from the group consisting of expanded polyethylene foam, cross linked polyethylene foam, polystyrene foam, neoprene rubber, gum rubber, and combinations thereof.

11. The container of claim 1 wherein at least part of the one or more second members is attached to the first member in a manner effective to form a fluid barrier there between.

12. The container of claim 1 wherein the first member includes one or more reflective surfaces along the outer surface.

13. A travelable container for contacting a support surface including:
   a first member defining the outer surface and inner surface of the container, the first member being constructed from a bendable liquid resistant material;
   a plurality of second members forming the perimeter of the container;
   additional material constructed from substantially similar material as the first member material adhered to the corners of the container in a manner effective for the first member and additional material to provide a leak proof fluid seal about the second members housed therein; and
   one or more anchoring members attached to the first member, the one or more anchoring members having a planar surface and one or more apertures there through, the planar surface being operationally configured to abut the support surface.

14. The container of claim 13 wherein the second members are constructed from one or more resilient materials.

15. The container of claim 13 wherein at least one second member includes a perforated seam with perforations spaced apart according to a desired bend angle of the second member.

16. A travelable container including:
a planar cross shaped one-piece construction first member; and
a plurality of perimeter forming plank type second members;
additional planar material;
wherein the first member and additional planar material are constructed from a bendable liquid resistant material;
wherein the additional planar material is adhered to the corners of the container about the second members; and
wherein the second members are sealed within the first member and the additional material in a manner effective to provide a leak proof sealed inner surface of the container operationally configured to hold one or more liquids, solids, and combinations thereof.

17. The container of claim 16 wherein the second members are constructed from one or more resilient materials.

18. The container of claim 17 wherein the second members include perforated seams.

* * * * *